US008059650B2

(12) United States Patent
Shetty et al.

(10) Patent No.: US 8,059,650 B2
(45) Date of Patent: Nov. 15, 2011

(54) HARDWARE BASED PARALLEL PROCESSING CORES WITH MULTIPLE THREADS AND MULTIPLE PIPELINE STAGES

(75) Inventors: Suhas A. Shetty, San Jose, CA (US); De B. Vu, Fremont, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 219 days.

(21) Appl. No.: 11/932,656

(22) Filed: Oct. 31, 2007

(65) Prior Publication Data
US 2009/0109974 A1    Apr. 30, 2009

(51) Int. Cl.
 *H04L 12/28* (2006.01)
(52) U.S. Cl. .................................................. 370/392
(58) Field of Classification Search .................. None
See application file for complete search history.

(56) References Cited

U.S. PATENT DOCUMENTS

| | | | | |
|---|---|---|---|---|
| 5,566,170 A * | 10/1996 | Bakke et al. | ........... | 370/392 |
| 6,119,215 A * | 9/2000 | Key et al. | ........... | 712/19 |
| 6,160,809 A * | 12/2000 | Adiletta et al. | ........... | 370/392 |
| 6,938,097 B1 * | 8/2005 | Vincent et al. | ........... | 709/240 |
| 7,072,978 B2 * | 7/2006 | Tsuboi et al. | ........... | 709/238 |
| 7,111,296 B2 * | 9/2006 | Wolrich et al. | ........... | 718/102 |
| 7,145,913 B2 * | 12/2006 | Craig et al. | ........... | 370/401 |
| 7,212,530 B1 * | 5/2007 | Lim et al. | ........... | 370/392 |
| 7,499,457 B1 * | 3/2009 | Droux et al. | ........... | 370/395.7 |
| 7,551,617 B2 * | 6/2009 | Eatherton et al. | ........... | 370/392 |
| 7,590,117 B2 * | 9/2009 | Di Gregorio et al. | ........... | 370/392 |
| 7,680,116 B1 * | 3/2010 | Lim et al. | ........... | 370/392 |
| 2002/0114338 A1 * | 8/2002 | Craig et al. | ........... | 370/401 |
| 2002/0138646 A1 * | 9/2002 | Tsuboi et al. | ........... | 709/238 |
| 2003/0069920 A1 * | 4/2003 | Melvin et al. | ........... | 709/108 |
| 2003/0231627 A1 * | 12/2003 | John et al. | ........... | 370/389 |
| 2003/0235194 A1 * | 12/2003 | Morrison | ........... | 370/389 |
| 2004/0098496 A1 * | 5/2004 | Wolrich et al. | ........... | 709/230 |
| 2004/0246956 A1 * | 12/2004 | Meng | ........... | 370/389 |
| 2005/0216710 A1 * | 9/2005 | Wilkinson et al. | ........... | 712/228 |
| 2005/0243734 A1 * | 11/2005 | Nemirovsky et al. | ........... | 370/252 |
| 2006/0067315 A1 * | 3/2006 | Tan et al. | ........... | 370/389 |
| 2006/0070054 A1 * | 3/2006 | Naik et al. | ........... | 717/165 |
| 2006/0179156 A1 * | 8/2006 | Eatherton et al. | ........... | 709/238 |
| 2006/0182118 A1 * | 8/2006 | Lam et al. | ........... | 370/395.42 |

* cited by examiner

*Primary Examiner* — Ayaz Sheikh
*Assistant Examiner* — Faiyazkhan Ghafoerkhan
(74) *Attorney, Agent, or Firm* — Blakely, Sokoloff, Taylor & Zafman

(57) ABSTRACT

A pipelined out-of-order process and system for handling data packets in a network device. The process and system are scalable to support throughput in excess of 10 Gbps. The system includes a set of processing cores that offload the table look up operations and similar operations from the central processing unit. The central processing unit receives the requisite data needed for performing forwarding, routing, NAT, firewall maintenance and similar operation on data packets from the set of processing cores.

17 Claims, 10 Drawing Sheets

HARDWARE BASED PARALLEL PROCESSING CORES WITH MULTIPLE THREADS AND MULTIPLE PIPELINE STAGES

BACKGROUND

1. Field of the Invention

The embodiments of the invention relate to a method and apparatus for improved throughput in a network device. Specifically, embodiments of the invention relate to a method and apparatus for scalable pipelined and out of order packet processing in a network device.

2. Background

Computer networks such as local area networks, wide area networks, the Internet and similar networks are utilized to transfer data between computers over short or long distances. Computer networks often utilize multiple transmission mediums, network devices and protocols. The number of computers attached to computer networks, the amount of data and the frequency at which these computer networks are used are constantly increasing. Increasingly, computer networks rely on large numbers of network devices to transfer and route data through the networks from a source computer to a destination computer. The speed and efficiency of the network devices responsible for the transfer and routing directly impacts the speed and throughput of the networks.

Network devices analyze received data to determine how to forward the data to ensure it reaches its ultimate destination. Many types of protocols are used to transfer the data. Each protocol utilizes different data structures to package the data and identify its destination and relevant information about the data to be transferred. The protocols are often nested one within the other or similarly interconnected. The network devices process each received data packet by processing at least one protocol level and determining a destination for the packet. Often the transmission protocols are closely related to the type of transmission medium. The network device can be connected to multiple types of transmission mediums and multiple lines of each transmission medium. The determination of the destination by the network device can also encompass the determination of the appropriate transmission line, transmission medium type and intermediate destinations and the appropriate formatting of the packet data to comply with the requirements of the transmission medium, transmission line and intermediate destinations.

The typical network device includes a processing unit, a set of communication ports and a memory device for storing forwarding tables or routing tables. The network device receives data on a communication port and processes the data packet by packet. The packets are examined and forwarded in order and the protocols of each packet are similarly serially examined. If the packet has not reached its end destination, the processor uses a forwarding table to determine the communication port and the next machine to receive the packet. The packet is then transmitted through a communication port determined by the forwarding table or routing table and any modification to the packet data that is needed due to differences in protocols or mediums for the communication port and receiving machine. The serial processing and processor speed serves as a limit on the bandwidth capabilities of the network device.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

In the following description, for the purpose of explanation, numerous specific details are set forth in order to provide a thorough understanding of the various embodiments. It will be apparent to one of ordinary skill in the art that the embodiments may be practiced without some of these specific details. In other instances, certain structures and devices are omitted or simplified to avoid obscuring the details of the various embodiments.

The following description and the accompanying drawings provide examples for the purposes of illustration. However, these examples should not be construed in a limiting sense as they are not intended to provide an exhaustive list of all possible implementations.

Figure 1:
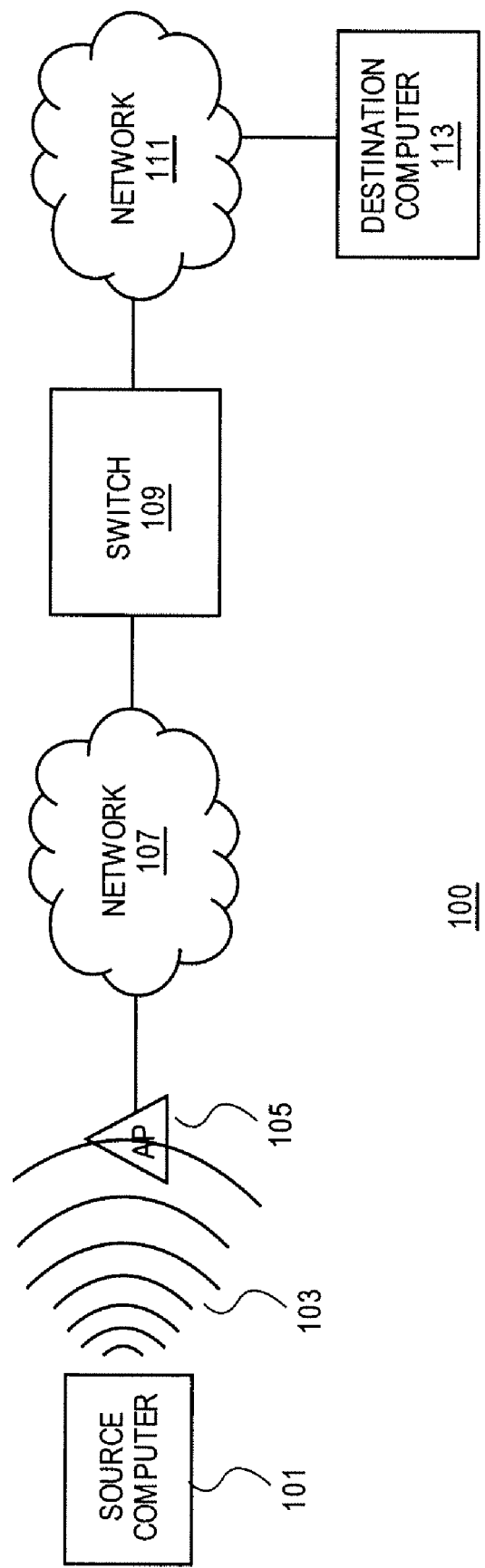
FIG. 1 is a diagram of one embodiment of an example networking environment.

FIG. 1 is a diagram of one example embodiment of a network communication system. The example network communication system 100 is a simplified example of a networking environment. The network communication system 100 includes a source computer 101, access point (AP) 105, a first network 107, network device 109, a second network 111 and a destination computer 113. The network communication system 100 is an environment in which the embodiments of the invention further described herein may be practiced.

The source computer 101 can be any type of device capable of transmitting data over a network including a desktop or laptop computer, a cellular phone, a personal digital assistant (PDA), a console device or similar type of device. The source computer 101 includes at least one communication or networking component allowing it to transmit and receive data through the network communication system 100. The communication component can be a wire line or wireless communication device such as a network interface card (NIC) that supports communication over Ethernet, 802.11 b/g/n, radio frequency (RF), cellular communication systems, Bluetooth, infra red (IR), universal serial bus (USB) or similar mediums and protocols. The source computer 101 can initiate or receive requests to establish a communication session with a destination computer 113. These communication sessions can be established using end to end communication protocols such as the Internet protocol or similar protocols. Other protocols may also be embedded within the communications that are specific to particular mediums or connections within the communication system 100.

In the example network communication system 100, the source computer 101 communicates over a wireless connection 103 with an access point 105. The access point 105 can be any type of networking device that provides access to a network 107 to a source computer 101 communicating wirelessly 103 (e.g., by 802.11 b/g/n or Bluetooth). In another embodiment, the source computer 101 can connected directly to the first network 107 through a NIC or similar communication device. The access point 105 includes a transceiver to support wireless communication connections with any number of computers such as the source computer 101. The access point 105 forwards traffic received from the source computer and other connected devices over the network 107 to a switch 109 and toward the destination computer 113. The access point can support any type of wireless and wire line communication including Ethernet, 802.11 b/g/n, RF, cellular communication systems, Bluetooth, IR, USB and similar communication technologies.

In one embodiment, the first network 107 can be any type of network including a local area network (LAN), wide area network (WAN) such as the Internet or similar network. The network 107 can include any number of computers and networking devices that support communication across the network 107 between any number of computers and network devices. The network can utilize any combination of protocols and physical communication media including the internet protocol (IP), transmission control protocol (TCP), user datagram protocol (UDP), Ethernet, fiber optic, coaxial cable and similar technologies.

The switch 109 is a network device that receives data through any communication port and forwards the data toward its destination through an appropriate communication port. The switch 109 can support communication over any type of communication media and protocol including IP, TCP, UDP, Ethernet, fiber optic, coaxial cable and similar technologies. The switch 109 analyzes the data packets that are received and determines whether to forward the data packet and which communication port to forward the packet over using a routing table and/or forwarding table that it maintains. The routing table stores routing information to specific destinations in the attached networks. The routing table information includes the topology of the networks attached to the switch. The routing table information is compiled through routing protocols and the use of static routes. The routing tables may not be used directly for the forwarding of packets. Instead, data for a forwarding table can be derived from the routing table. Data in the forwarding table may reflect preferred routes for packet forwarding. The data in the forwarding table can be optimized for quick lookup.

The switch 109 can be connected and facilitate forwarding across any number of networks including the first network 107 and a second network 111. In another embodiment, the switch 109 is a part of a single network. The second network 111 can be any type of network including a local area network (LAN), wide area network (WAN) such as the Internet or similar network. The second network 111 can include any number of computers and networking devices that support communication across the second network between any number of computers and network devices. The second network can utilize any combination of protocols and physical communication media including IP, TCP, UDP, Ethernet, fiber optic, coaxial cable and similar technologies.

The destination computer 113 can be any type of device capable of transmitting data over a network including a desktop or laptop computer, a cellular phone, a personal digital assistant (PDA), a console device or similar type of device. The destination computer 113 includes at least one communication or networking component allowing it to transmit and receive data through the network communication system 100. The communication device can be a wire line or wireless communication device such as a NIC that supports communication over Ethernet, 802.11 b/g/n, RF, cellular communication systems, Bluetooth, IR, USB or similar mediums and protocols. The destination computer 113 can initiate or receive requests to establish a communication session with a source computer 101.

Figure 2:
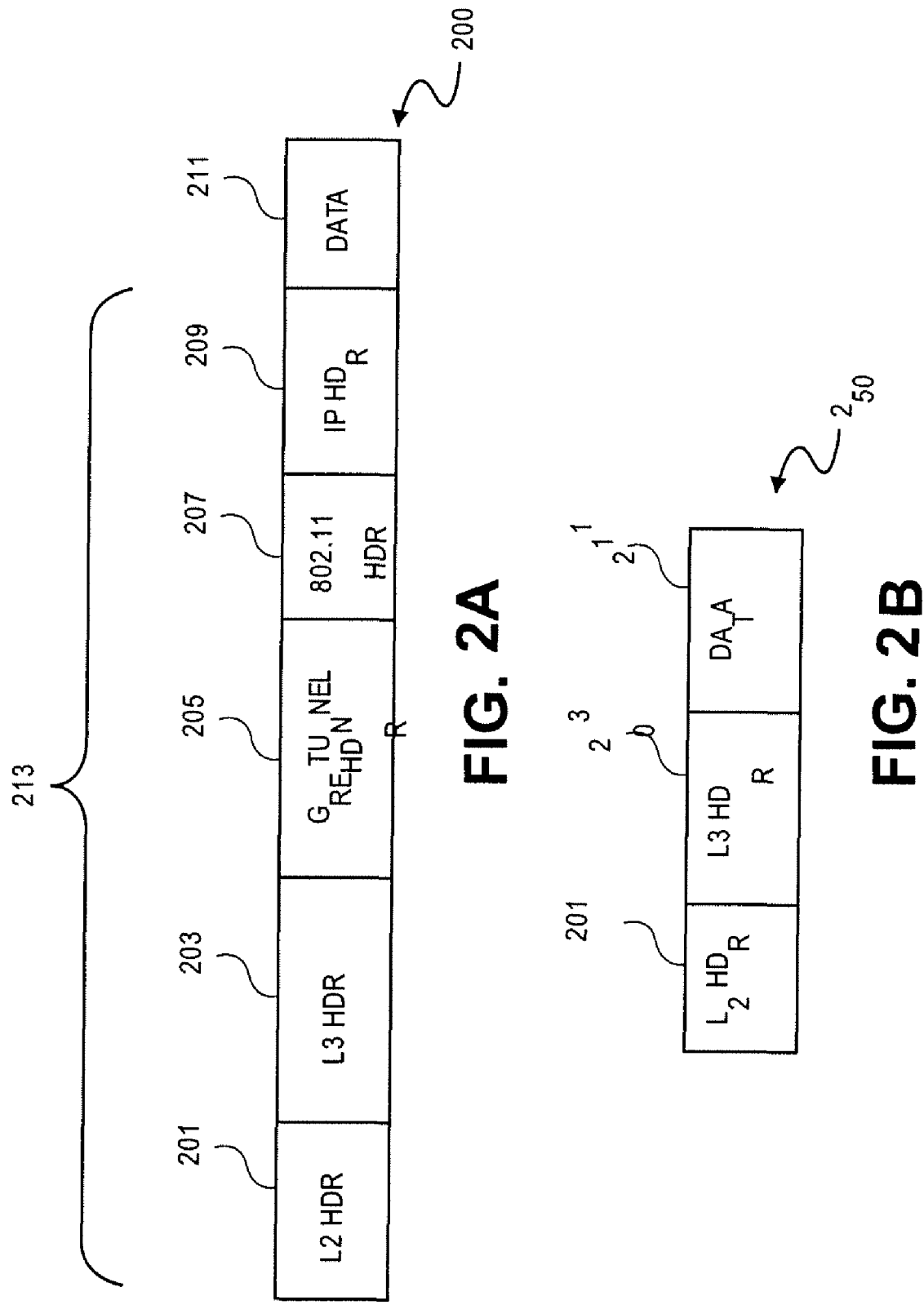
FIG. 2A is a diagram of one embodiment of an inbound packet.
FIG. 2B is a diagram of one embodiment of an outbound packet.

FIG. 2A is a diagram of one embodiment of an inbound data packet. An inbound data packet in this example is a packet received either directly or indirectly by a network device from the source computer. For purposes of this example embodiment, the inbound data packet is assumed to be received by the switch from the source computer in the network communications system of FIG. 1.

The data packet 200 can have any number of header sections 213 and a body or data section 211. Each of the headers 213 corresponds to a separate protocol or set of protocols. The header information for a particular protocol is used for the routing and processing of the packet to ensure compliance and forwarding consistent with the protocol and intended intermediate and final destinations. The data packet 200 can be of any size and include any number of headers or similar data structures. In the illustrated example, an inbound data packet 200 is shown that includes a layer 2 (L2) protocol header 201 (i.e., the data link layer of the Open Systems Interconnection Basic Reference Model (OSI model)), a layer 3 (L3) protocol header (i.e., the network layer of the OSI model), a tunneling protocol header 205 (e.g., a general routing encapsulation (GRE) header), an 802.11 header 207, and IP header 209.

This example packet demonstrates the multiple levels of encapsulation that may be present in any given data packet received by a network device. Each of the headers must be analyzed and lookup operations performed to determine proper routing/forwarding for the packet. The embodiments described further herein improve the processing of these packets by processing the various headers in parallel and out of order, the parallel and out of order processing refers to parallel and out of order processing between headers of the same packet and headers of separate packets as well.

FIG. 2B is a diagram of one embodiment of an outbound data packet. The example outbound packet 250 illustrates a simpler packet data structure with fewer headers than that of the example inbound packet 200. For purposes of this example embodiment, the outbound data packet is assumed to be transmitted by the switch over the second network to the destination computer in the network communications system of FIG. 1. The outbound data packet in this example is a packet received either directly or indirectly by the switch from the source computer and has been processed and ready for forwarding onto the second network.

The processing of the inbound packet 200 can generate a simpler or more complex data packet dependent on the analysis of the inbound packet 200 and the determination of the routing/forwarding of the outbound packet 250. The example packet 250 is reduced in complexity from the inbound example packet 200, because the route to the corresponding destination computer does not require tunneling or wireless communication, thus, those aspects of the header are removed by the switch and updated L2 201 and L3 203 headers are provided. The data portion 211 is likely to remain unmodified.

Figure 3:
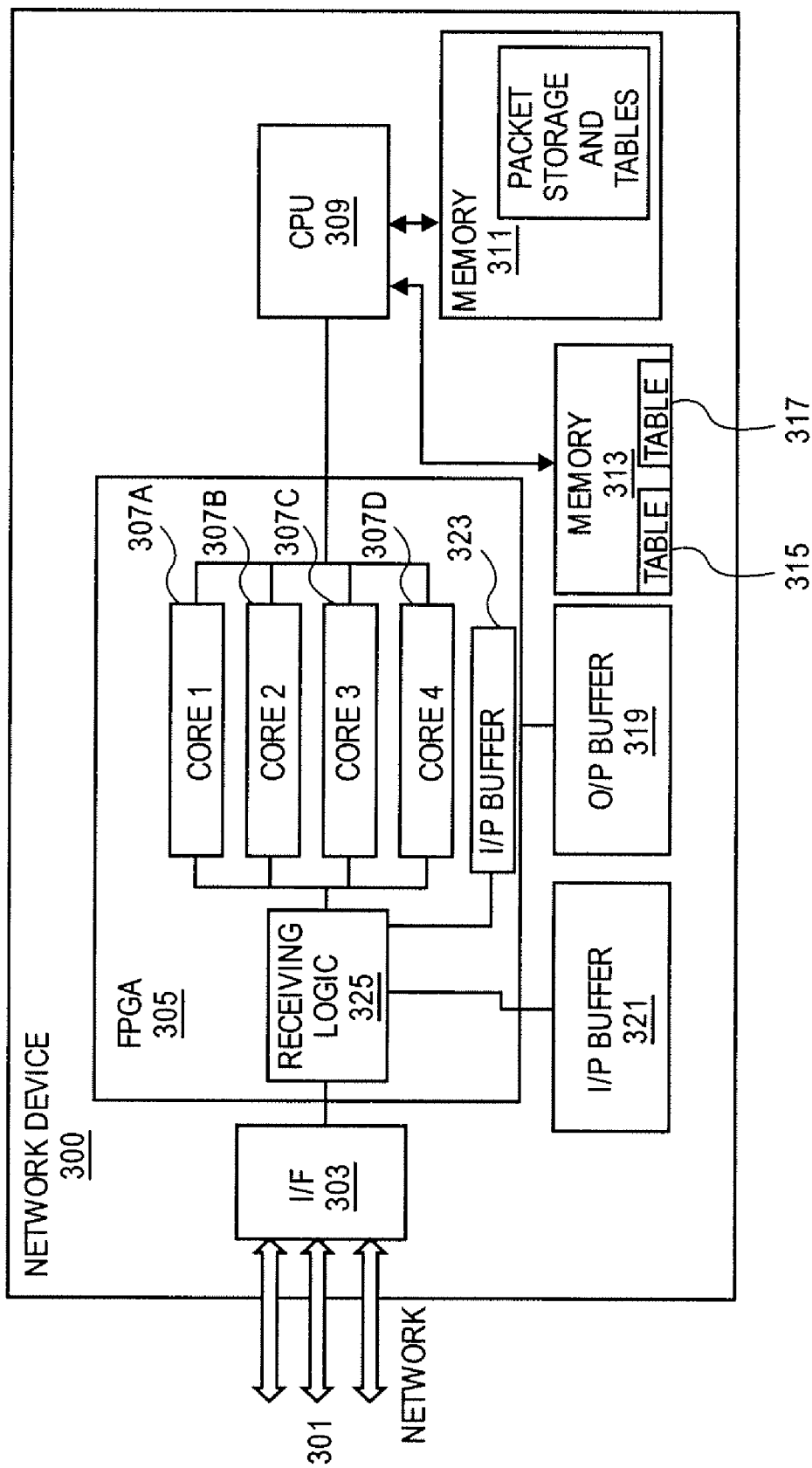
FIG. 3 is a diagram of one embodiment of a network device.

FIG. 3 is a diagram of one embodiment of a network device. The networking device 300 may be a switch, router or similar device for managing the transmission of data over a network. In one embodiment, the network device includes a set of interfaces (I/F) 303, processing cores 307A-D and receiving logic 325 that can be part of a field programmable gate array (FPGA) 305, a central processing unit 309 and a set of memory devices 311, 313, 319, 321 and 323. A set, as used herein, refers to any positive number of items including one item.

The network device 300 can include any number of interface devices 303. Each interface device 303 can provide a communication port to a network or set of networks 301. Data is received by the network device 300 in the form of packets through the network interface 303. The data is then forwarded to the FPGA 305 or receiving logic 325 components for further processing. In one embodiment, the incoming data is first buffered in an input (I/P) buffer 321 external to the FPGA 305 or an I/P buffer 323 internal to the FPGA 305 by the receiving logic 325 to await processing by the cores 307A-D of the FPGA 305.

The internal input buffer 323 can be any size memory or storage are within the FPGA 305. The internal input buffer 323 is managed by the receiving logic 325 and stores incoming data until assigned to a core 307A-D of the FPGA 205. The external input buffer 321 can be used to store incoming data that cannot be stored in the internal input buffer 323. The external input buffer 321 can be any size memory or storage device. The external input buffer 321 can store incoming data received from the interface device 303 directly or through the receiving logic 325 or other controller. The use of space in the input buffer 321 may be managed by the FPGA 305, receiving logic 325, central processor 309, memory controller or similar component.

The network device 300 includes an FPGA 305 or similar device that processes the incoming and outgoing data packets to offload work from the central processing unit 309. In another embodiment, the FPGA 305 is an application specific integrated circuit (ASIC), a group of ASICS or FPGAs or similar configuration of devices. The FPGA 305 can include any number of core processing units 307A-D. The number of core processing units 307A-D can be scaled to provide any level of throughput for the network device including throughput in excess of 10 Gigabits per second (Gbps). In one embodiment, the scaling is accomplished by adding additional core processing units 307A-D in a single FPGA 305. In another embodiment, the number of core processing units 307 is increased by increasing the number of FPGAs 305.

The FPGA 305 may include additional circuitry or components in addition to the core processing units 307A-D. The additional circuitry or components can include a load balancer and receive logic 325 that receives the incoming data from the interface 303 or input buffer 321 and distributes it amongst the core processing units 307A-D and manages the storage of the data including dropping of packets if the incoming data exceeds the capacities of the network device to process. Any load balancing algorithm can be employed to distribute the incoming packets amongst the core processing units 307A-D. Any memory management algorithm can be used to manage the storage of incoming data. In another embodiment, the receiving logic 325 including the load balancing and memory management functions can be a separate device or component.

The core processing units 307A-D each perform multiple operations to prepare or retrieve data for each packet to be analyzed by a decision engine executed by the central processing unit 309. The operations performed by the core processing units 307A-D can include bridging, session classification and services, firewall, route cache lookup and similar operations. Any number of operations can be performed by the core processing units 307A-D. The operations of the core processing units 307A-D are primarily lookup operations on a variety of related tables. These operations can frequently be blocked and are slow due to the access times of the memory devices storing the lookup data. Offloading these operations from the central processing unit 309 allows the network device through its decision engine to more quickly perform the functionality required of the network device and decision engine including firewall protection, network address translation (NAT), forwarding and similar functions.

The network device 300 can include a variety of memory devices. The memory devices can include an input buffer 321 to store incoming data packets, an output (O/P) buffer 319 to store data packets that have been processed and are awaiting transmission by the interface 303 or have been processed by the central processing unit 319 and are awaiting processing by the FPGA 305, a general device memory 313, and a dedicated memory 311 for use by the central processing unit 309. The general device memory 315 may store table data 315, 317 utilized by the FPGA 305 and the central processing unit 317. The tables can including NAT tables, routing tables, forwarding tables, media access control (MAC) source and destination data, session data, bridge data and similar data and tables. Similarly, the dedicated memory 311 provides a working memory for the central processing unit 309 and storage for packets and tables utilized or being processed by the central processing unit 309 including routing tables, forwarding tables, NAT tables, MAC source and destination data, session data, bridge data and similar data and tables. The access, caching and movement of data to and from the various memory devices can be handled by a memory controller or set of memory controllers. The set of memory controllers can be a part of or separate from the FPGA 305.

Figure 4:
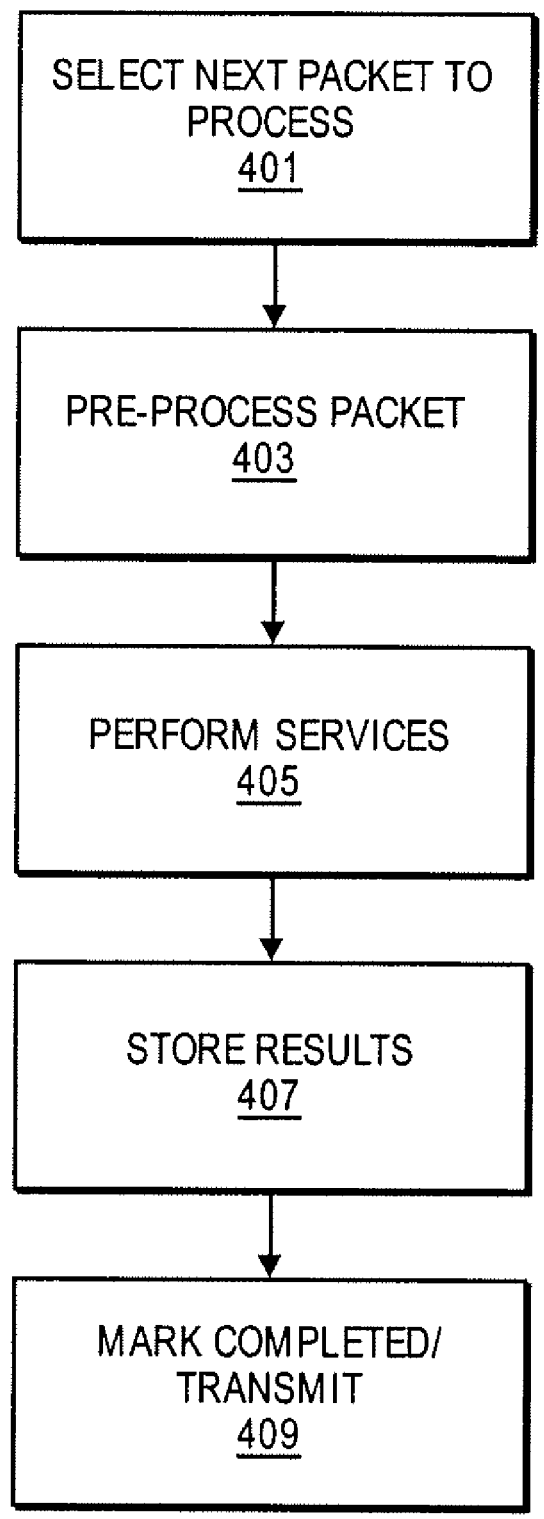
FIG. 4 is a flowchart of one embodiment of a process for packet handling.

FIG. 4 is a flowchart of one embodiment of a process for packet handling. This flowchart provides a generalize description of the overall process of the networking device. The device selects a received packet to process (block 401). Any selection mechanism or algorithm can be utilized to determine which of the incoming data packets are to be processed. The packets are pre-processed by the FPGA to prepare or retrieve the data necessary to process the data packet (block 403). The processing of the data packets and their constituent components is done in parallel and out of order by the core processing units of the FPGA. The processing can include performing lookups of data related to the headers of the incoming data packets and the modification of the headers of the incoming data packets.

The central processing unit executes a decision engine that processes each packet performing the necessary routing, NAT, firewall operation, encryption, authentication or similar network device function (block 405). The results of the operation are then stored in the memory of the network device (block 407). The processed data packets can be stored in the output buffer until the interface device is available. The processed data packet is then transmitted, erased, marked as completed or similarly resolved by the network device (block 409). The resolution is dependent on the analysis of the packet by the decision engine. For example, a received data packet may be forwarded to its next hop along its calculated route. In another example, a control packet may change or alter tables in the network device. An outbound data packet can also be subject to additional post-processing by the FPGA to complete the processing of the data packet before transmission. The outbound operations can include routing, forwarding, MAC source and NAT lookups and similar operations. In one embodiment, the FPGA handles inbound and outbound traffic. In another embodiment, a separate secondary or outbound FPGA handles the outbound post-processing.

Figure 5:
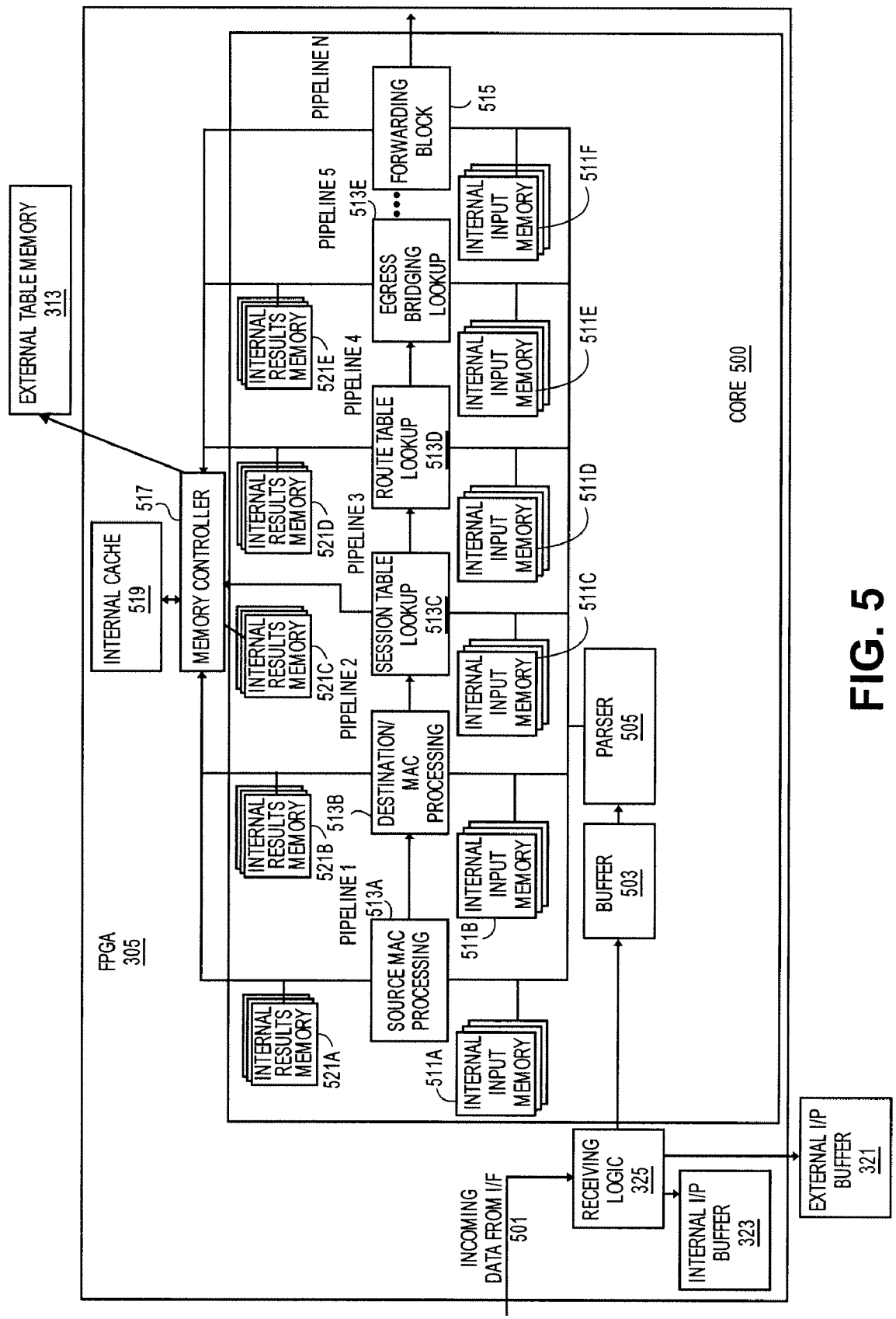
FIG. 5 is a diagram of one embodiment of a network device core processing unit.

FIG. 5 is a diagram of one embodiment of a network device core processing unit within the FPGA. A single core 500 and its component are illustrated for sake of clarity. An FPGA 305 can include any number of cores. In one embodiment, the core processing unit 500 includes a parser 505, a set of specialized processing units 513A-E, a forwarding block 515 and supporting memory devices and logic. Each of the specialized processing units 513A-E can each execute a set of threads simultaneously. The forwarding block 515 may also execute a separate set of processing threads. The set of threads for each specialized processing unit 513A-E and forwarding block 515 allows the individual processing units 513A-E and forwarding block 515 to process the packet header data in parallel and out of order independent of one another.

Each core processing unit 500 can include identical components. Any number of core processing units can be included in an FPGA or set of FPGAs. In another embodiment, core processing units may have different sets of specialized processing units 513A-E that are tailored to specific types of data or data traffic. The load balancer or similar algorithm of the receiving logic 325 then schedules the data packets at least in part upon the availability of the core processing units that would be most efficient or capable of handling each data packet.

An incoming data packet 501 is processed by the receiving logic 325. The receiving logic 325 manages the balancing of the load across all the cores of the FPGA 305. If a core 500 is available the incoming data 501 is stored in the in a parsing buffer 503 internal to the core processing unit 500. If no core is available the incoming data 501 may be stored in the internal input buffer 323. If the internal input buffer 323 is full, then the incoming packet data 501 can be stored in the external input buffer 321. In another embodiment, copies of incoming data can be stored in the internal or external input buffer 323, 321, which can be done in parallel with the storage in the parsing buffer 503. When a core 500 becomes available, the incoming data packet 501 is retrieved from the internal or external input buffer 323, 321 and stored in the parsing buffer 503.

A parser 505 processes the data packets in the parsing buffer 503. In one embodiment, the parsing buffer 503 operates as a first-in-first-out (FIFO) queue. The parser 505 analyzes each data packet to identify each of the headers and the data contained in the packet. The parser 505 determines the type of each of the headers present in the data packet and operations that need to be performed on each header, portion of a header or segment of a data packet. The parser 505 then forwards each of the detected headers, data in the headers or data packet segments of the incoming data packet 501 to the respective specialized processing unit 511A-E. For example, a packet with a L2 header has the relevant data forwarded to the source and destination MAC processing units 511A, 511B to perform MAC source and destination determination.

The data forwarded to each of the specialized processing units 513A-E, which may also be characterized as pipeline stages, is stored in an internal input memory 511A-E or buffer. The internal input memory 511A-E stores the data until it is processed by the specialized processing unit 513A-E. The internal input memory 511A-E can be any size and hold any amount of data. In another embodiment, a single input memory or set of shared input memories are shared amongst the specialized processing units 513A-E and forwarding block. The general process of each specialized processing unit 513A-E is described in regard to FIG. 6 below. Any number of specialized processing units 513A-E can be included in the core 500 to perform any number or type of tasks. In the illustrated embodiment, a source MAC processing unit 513A determines a source MAC address for an incoming data packet 501. A destination MAC processing unit 513B determines a destination MAC address for an incoming packet 501. A session table lookup unit 513C determines a session for an incoming data packet 501. A route table lookup unit 513D determines a route or the next hop destination for an input data packet 501. An egress bridging lookup unit 513E determines an egress bridge address for an incoming data packet 501.

The results of each of the specialized processing units 513A-E are output and stored in an internal result memory 521A-E. The results may also each be forwarded to other pipeline stages that require the resulting information. The result data may be directly forwarded or an indicator sent to inform other pipeline stages that the data is available in the internal result memory 521A-E. Some pipeline stages may block the processing of segments dependent on the availability of result data. Receiving the result data or an indicator of its availability can unblock the processing of the associated packet header, portion or segment.

A memory controller 517 manages accesses by the specialized processing units 513A-E and the forwarding block 515 to the internal cache 519 and external memory such as the external table memory 313. The specialized processing units 513A-E access external table memory 313 or the internal cache 519 to perform lookups on the tables maintained therein. Look up data that is not found in the internal cache 519 is retrieved from the external table memory 313 and stored in the internal cache 519. Any cache management scheme can be used to manage the internal cache 519. The internal cache can be exclusive to the core 500 or shared amongst the cores of the FPGA 305 as well as other components of the FPGA 305.

The forwarding block 523 retrieves the packet data that has been processed in each of the internal result memories 521A-E and forwards the packet 501 along with the results to the external output buffer 319. The processed data packet is then accessed from the external output buffer 319 for further processing by the decision engine.

Figure 6:
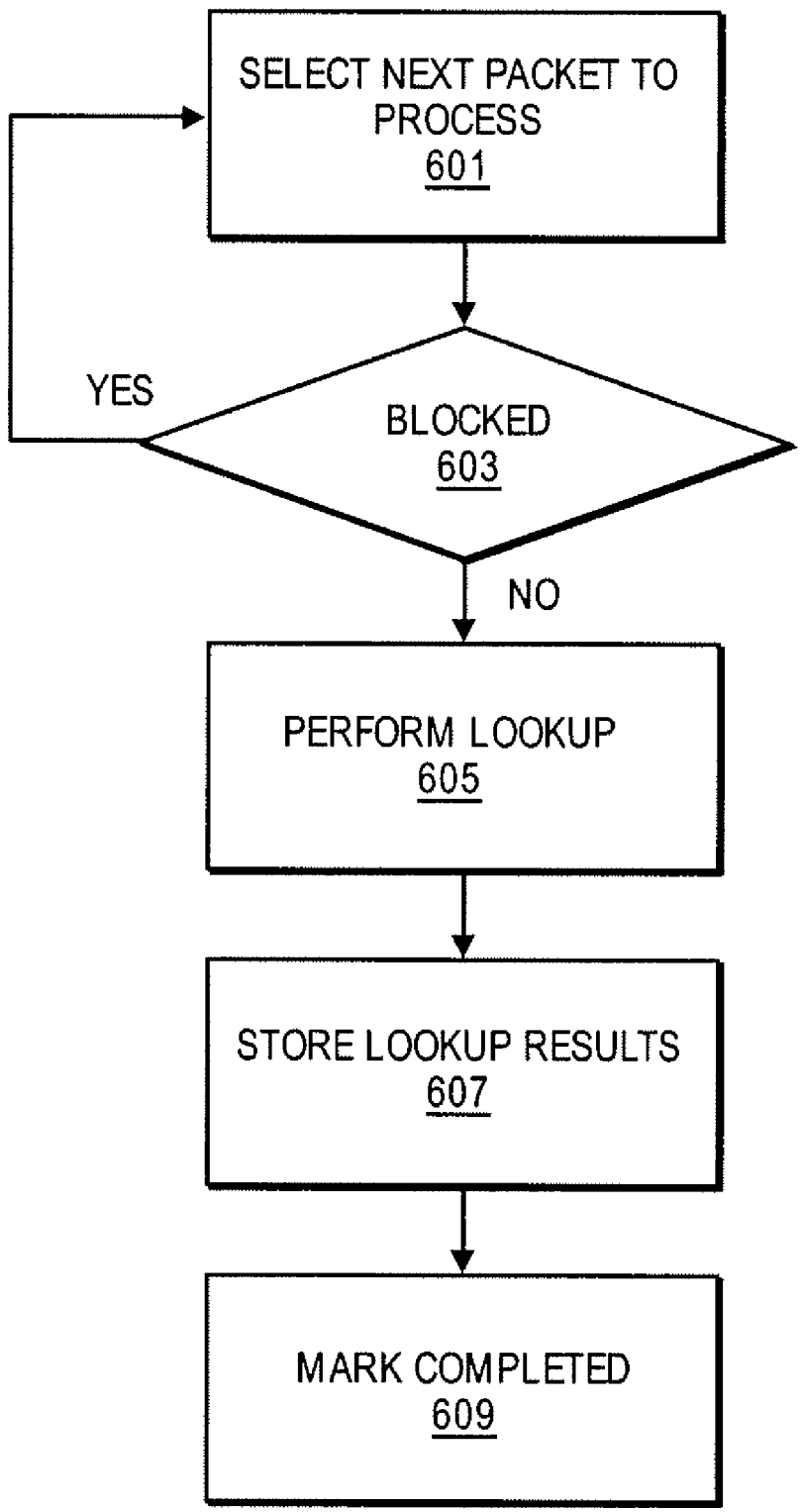
FIG. 6 is a flowchart of one embodiment of a general process of the specialized processing units in the core processing units.

FIG. 6 is a flowchart of one embodiment of a general process of the specialized processing units. The process illustrates the basic functioning of the specialized processing units. The specialized processing units select a next data packet to process from their respective internal input memories (block 601). Any selection process can be used or the input memory may act as a queue such as a FIFO queue to determine the next data packet to process. If a selected packet is blocked, then it is skipped and another packet is selected for processing (block 603). A packet is blocked when requisite parameters or data from other specialized processing units is not available in the internal result memories or has not been received. A check to determine the availability of the requisite data is performed. The requisite data can be received from the associated specialized processing unit and stored in the input memory, in the result memories or other memory accessible to the forwarding block. Each location can be checked to determine the availability of the requisite data. In another embodiment, an indicator or signal is received providing a location of the requisite data or information about its availability.

After a packet has been selected for processing, the specialized operation of the specialized processing unit is performed. In many cases, the operation is a lookup into a table in the general memory (block 605). A specialized processing unit can perform any operation and any number of operations. The design of the pipeline stages is optimized by limiting the specialized processing units to a small number of operations and spreading more complicated operations over multiple specialized processing units to maximize the parallel processing and out of order processing capabilities of the core processing unit. The results of the operation(s) performed by the specialized processing unit are then stored in the internal result memories (block 607). The operation or pipeline stage is then marked as complete for that data packet (block 609). This may directly or indirectly signal to the other pipeline stages that the result data is available to be utilized if needed. For example, once all of the pipeline stages have been marked for a packet as completed, then the forwarding block outputs the data to the external output memory.

Figure 7:
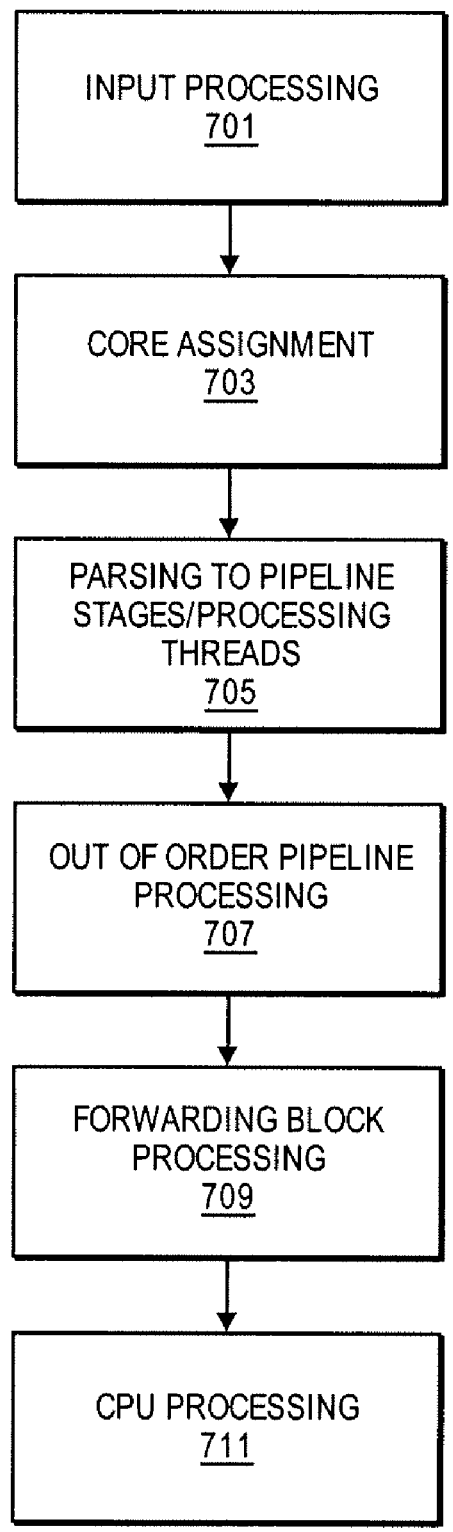
FIG. 7 is a flowchart of one embodiment of incoming packet processing.

FIG. 7 is a flowchart of one embodiment of incoming packet processing. Inbound packet processing indicates the processing of a packet received at a communication port of the networking device. In one embodiment, a data packet received by the network device is initially processed to store it in the input memory (block 701). Input processing can include basic L1 processing of the data received over the communication port. The data packet is then provided to the FPGA and processed by the receiving logic and load balancer, which assigns the data packet to a core processing unit for pre-processing before being processed by the decision engine executed by the central processing unit (block 703). The network device can also include separate receiving logic that manages the input buffers and other operations related to the managing of incoming data packets.

The assigned core processing unit parses the incoming data packet and sends the headers or segments of the data packet to separate pipeline stages each with their own specialized processing unit having its own processing thread (block 705). The parser determines the appropriate specialized processing unit for each of the identified headers or segments. For example, a L2 header may be forwarded to a MAC source or destination determination specialized processing unit. The separate processing threads each process the respective segments or headers of the packet independently of one another to effect out of order processing in the core (block 707). Some headers or segments may require the results of other headers or segments, in which case the processing of these headers or segments is blocked until the requisite data is available.

As each segment or header is processed the processing thread stores the results and marks the segment or header as completed. The results can be stored in an internal result memory associated with each pipeline stage and accessible to the forwarding block. The forwarding block then processes the data packet and processing thread results (block 709). The forwarding block stores the result data and data packet in the output buffer to be processed by the decision engine, which is executed by the central processing unit. The decision engine and central processing unit load the data packet and associated FPGA data from the output buffer and process the data packet (block 711). The processing of the data packet is dependent on the type and content of the headers of the data packet. The decision engine can modify the packet using the results from the FPGA by updating source and destination addresses, adding or removing encapsulation layers or protocols, performing NAT, applying firewall restrictions or similarly processing the packet.

Figure 8:
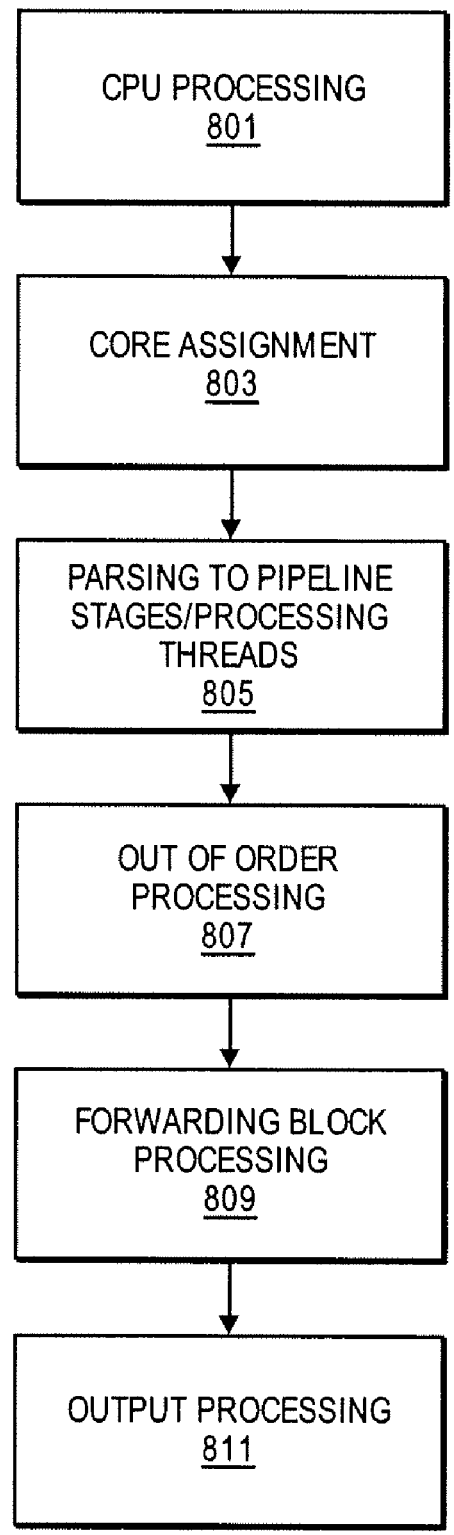
FIG. 8 is a flowchart of one embodiment of outgoing packet processing.

FIG. 8 is a flowchart of one embodiment of core outbound packet processing. Outbound packet processing indicates the processing of a packet by a central processing unit and the other components of the network device as it is prepared for transmission over a communication port of the network device. The data packet may be a received data packet that is to be forwarded or a data packet that originates with the network device.

A central processing unit may complete processing of a packet or creation of a packet and forward it to the FPGA for post-processing (block 801). The central processing unit may store the processed packet in the input or output buffers. The packet processing by the central processing unit can include performing NAT, forwarding, firewall operations, routing table maintenance and similar operations. In one embodiment, the FPGA retrieves the data packet and applies a load balancing algorithm to determine which of the cores to assign the packet (block 803). In another embodiment, no post processing is necessary on the data packet stored in the outbound buffer by the central processing unit. In this case, processing by the FPGA can be skipped.

In the case where post-processing is needed, the core processing unit of the FPGA parses the data packet into packet headers and segments and assigns them to the pipeline stages and processing threads of the various specialized processing units (block 805). The processing threads and pipeline stages operate independently to perform parallel and out of order processing on the packet headers and segments (block 807). Once the packet headers and segments have been processed, then the forwarding block forwards the completed packet to be stored in the output buffer to await output processing (block 809). Output processing includes the interface unit transmitting the completed data packet on the communication port determined during the processing of the packet. The next hop or destination of the packet is also determined in the packet processing. The communication port associated with the next hop or destination is then utilized when available to transmit the data packet. The data packet processing is then completed and any remaining copies of the data of the packet can be deleted from the memory devices of the network device.

Figure 9:
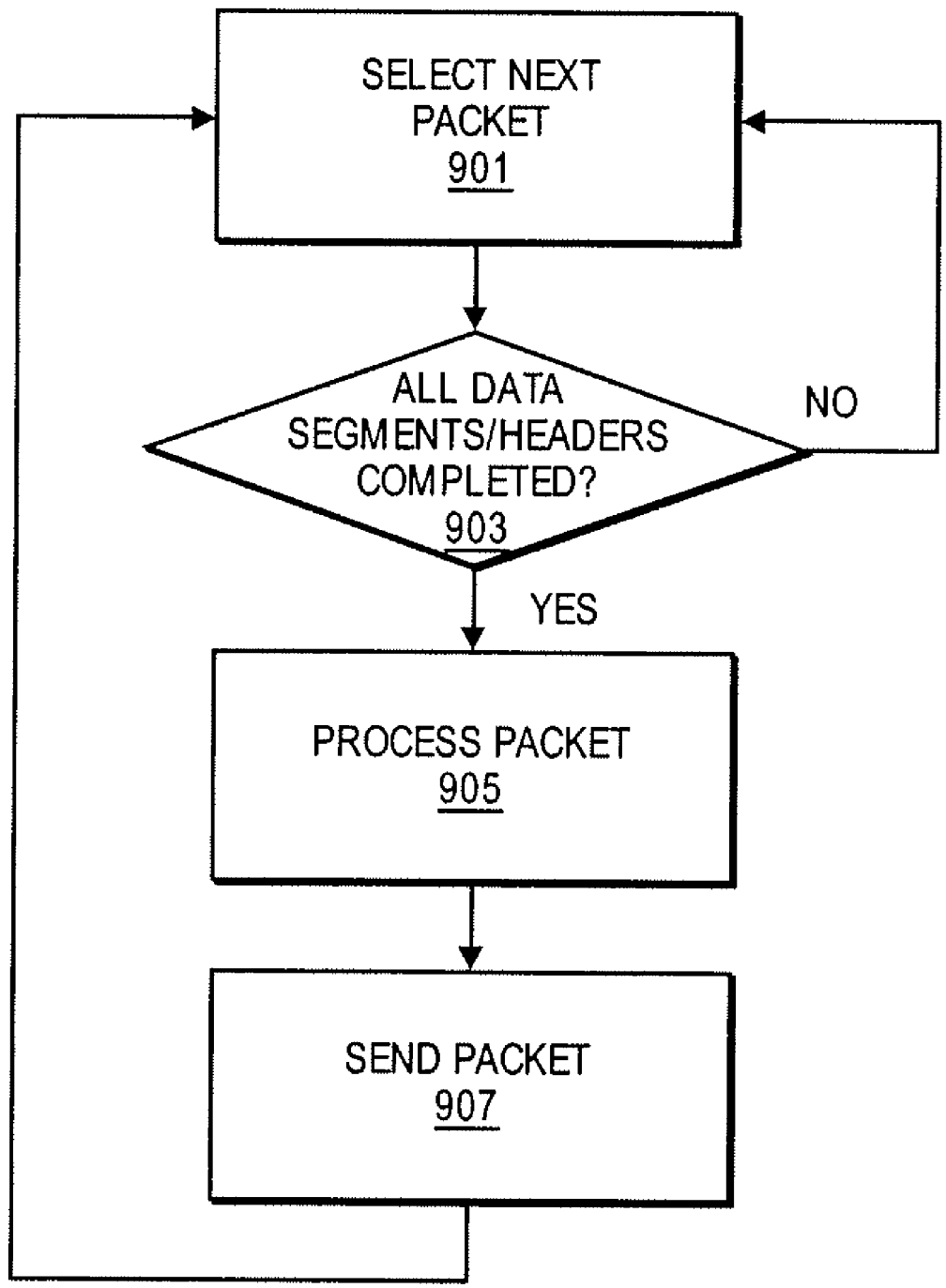
FIG. 9 is a diagram of one embodiment of processing by a central processing unit and forwarding block.

FIG. 9 is a diagram of one embodiment of packet processing by a central processing unit and forwarding block. In one embodiment, the forwarding block continually polls the data packets in the core processing unit in which it resides to determine if the processing of each of the data packets by the pipelines of the core processing unit has completed. The polling process continuously selects or determines the next data packet to monitor (block 901). Any selection algorithm or mechanism may be utilized to determine the next packet to monitor. The selected packet data is then checked to determine if each packet header or segment of that packet has been completed (block 903). This check may be completed by a check of the internal result memories or similar memories accessible to the forwarding block to ascertain the presence of the result data for each packet header or segment or data packet. The processing threads of each pipeline state mark the packet header or segment as completed after that stage of the pipeline completes. If all of the packet headers or segments have not completed then the forwarding block determines the next data packet to monitor.

If each of the headers and segments of the data packet has completed then, the forwarding block provides the central processing unit with the data packet and results from the pipeline processing threads. The data may be intermediately stored in a buffer. The central processing unit then processes the data packet according to the type of data packet and the results of the pipeline processing (block 905). The data packet is then stored and readied for transmission to its next destination (block 907). In another embodiment, the data packet may be sent back to the pipeline in a core processing unit of an FPGA for further processing prior to being sent to the next destination. The central processing unit or FPGA store the outgoing data in an output buffer once ready for transmission and the interface device transmits the data on a designated communication port to its next destination at the next availability of the communication port and interface device.

Figure 10:
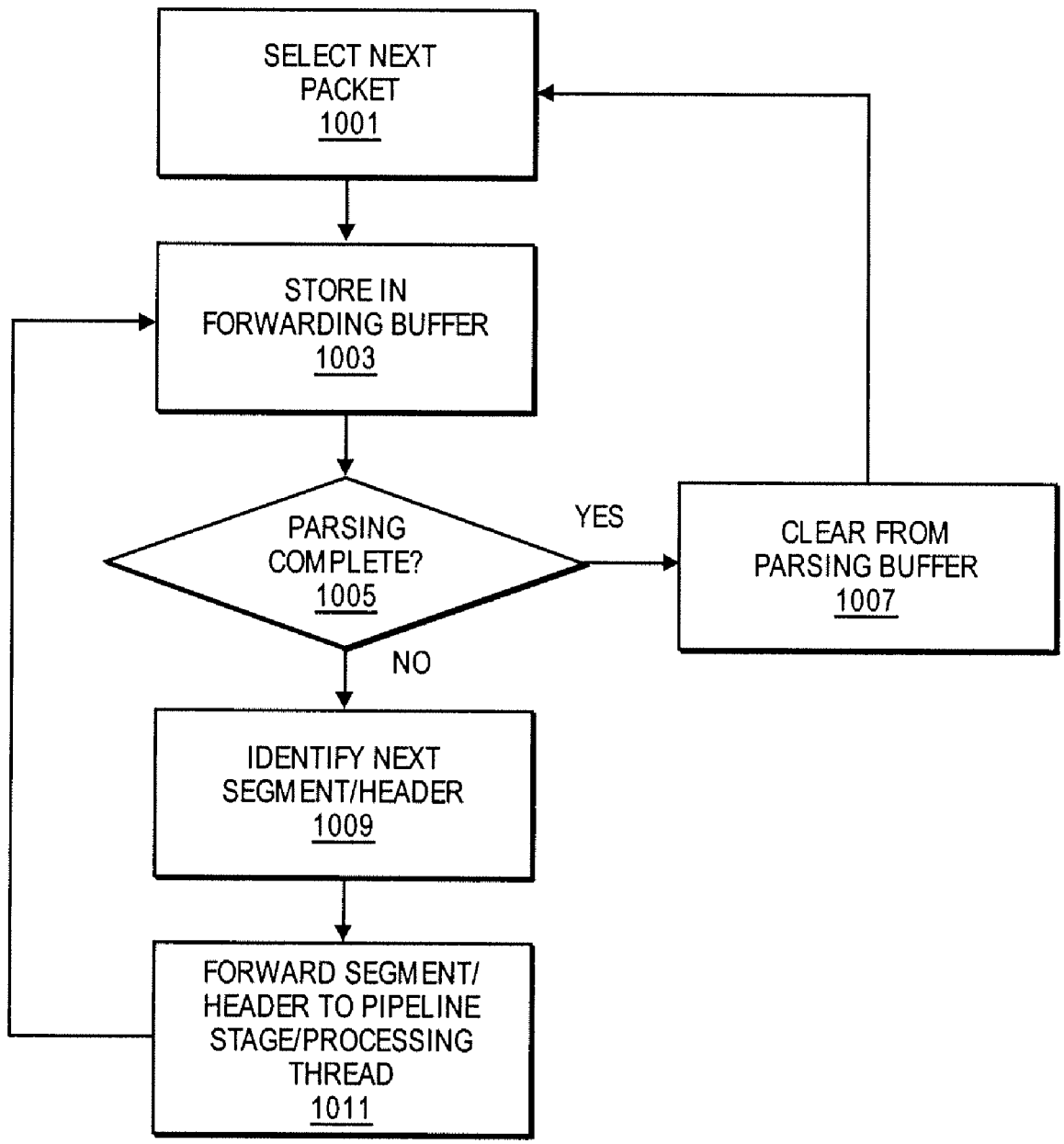
FIG. 10 is a diagram of one embodiment of parsing of a data packet.

FIG. 10 is a diagram of one embodiment of pipeline processing of a packet. The packet parser selects the next packet in its parsing buffer (block 1001). The parsing buffer can be a FIFO buffer or any other type of buffer or memory device. A separate selection algorithm or mechanism can also be utilized to select the next data packet to be processed. The parsing unit then stores a copy of the data packet in the forwarding buffer or a memory or memory region associated with the forwarding block (block 1003). The parsing of the data packet then begins by checking to determine if there are any segments or headers to be found in the data packet that have not been processed (block 1005). If the packet has been completely parsed, then the data packet is cleared from the parsing buffer and the next packet is selected for parsing (block 1007).

If the packet has not been completely parsed, then the next segment or packet header is identified (block 1009). The identified header or segment is forwarded to the appropriate processing thread/pipeline stage to be processed (block 1011). The process then continues to check for further segments or headers for processing (block 1005) until all of the headers and segments are sent to the appropriate pipeline stage and processing threads. The parsing unit may detect L2 headers, L3 headers, tunneling headers, IP headers and similar headers and packet segments.

In one embodiment, the network device may be implemented as a set of hardware components. In another embodiment, these components may be implemented partially or wholly in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
receiving a packet over a network;
selecting a first processing core from a plurality of processing cores to assign the packet, the selecting of the first processing core based on specialized processing unit availability in the first processing core and each of the plurality of processing cores;
parsing the packet to identify a first packet header and a second packet header;
assigning by the first processing core the first packet header and the second packet header to separate specialized processing units within the first processing core;
processing the first packet header and the second packet header in the separate specialized processing units to produce results;
determining a source media access control (MAC) address in a first specialized processing unit of the first processing core;
determining a destination MAC address in a second specialized processing unit of the first processing core;
determining a session for the packet in a third specialized processing unit of the first processing core;
determining a route for the packet in a fourth specialized processing unit of the first processing core;
determining an egress bridge address for the packet in a fifth specialized processing unit of the first processing core;
gathering the results of the separate specialized processing units for the packet at a forwarding block; and
deciding by the forwarding block an action to be performed on the packet based on gathered results.

2. The method of claim 1, wherein the selecting comprises:
scheduling the packet to the first processing core of the plurality of processing cores because the first processing core is more efficient in processing data in the packet than the other processing cores in the plurality of processing cores.

3. The method of claim 1, further comprising:
processing the first packet header and the second packet header in parallel.

4. The method of claim 1, further comprising:
processing received packets at greater than 10 gigabits per second.

5. The method of claim 2, further comprising:
forwarding the packet upon completion of processing by the separate specialized processing units to a central processing unit.

6. The method of claim 2, further comprising:
storing each header in an input memory of each separate specialized processing unit.

7. A system comprising: a receiving logic component configured to receive a first packet over a network and configured to select a first processing core from a plurality of processing cores to assign the first packet based on specialized processing unit availability in the first processing core and each of the plurality of processing cores; the plurality of processing cores including the first processing core, the first processing core including a plurality of specialized processing units, the first processing core configured to process level two and level three data of the first packet in separate specialized processing units of an out of order pipeline, the first processing core configured to parse the first packet to identify a first packet header and a second packet header, the first processing core configured to assign the first packet header and the second packet header to separate specialized processing units, the specialized processing units including a first specialized processing unit configured to determine a source media access control (MAC) address, a second specialized processing unit configured to determine a destination MAC address, a third specialized processing unit configured to determine a session for the packet, a fourth specialized processing unit configured to determine a route for the packet, and a fifth specialized processing unit configured to determine an egress bridge address for the packet; and a central processing unit (CPU) separate from the plurality of processing cores, the CPU coupled to the plurality of processing cores, the CPU configured to execute a decision engine that processes the first packet after the first processing core.

8. The system of claim 7, further comprising:
a second processing core coupled to the CPU, the second processing core to process level two and level three data of a second packet in separate specialized processing units of an out of order pipeline.

9. The system of claim 7, wherein the system processes packets at a throughput of at least 10 gigabits per second.

10. The system of claim 8, wherein the first and second processing cores are in a field programmable grid array (FPGA).

11. The system of claim 8, wherein the first and second processing cores process the first and second packets in parallel.

12. The system of claim 8, further comprising:
a memory device to store lookup data for the first processing core and the second processing core.

13. The device of claim 12, further comprising:
a memory controller to arbitrate access to the memory between the first processing core and the second processing core.

14. A non-transitory machine readable medium having instructions stored therein which when executed cause a machine to perform a set of operations comprising:
receiving a packet over a network;
selecting a first processing core from a plurality of processing cores to assign the packet, the selecting of the first processing core based on specialized processing unit availability in the first processing core and each of the plurality of processing cores;
parsing the packet to identify a first packet header and a second packet header;
assigning by the first processing core the first packet header and second packet header to separate specialized processing units;
processing the first packet header and the second packet header in the separate specialized processing units to produce results;
determining a source media access control (MAC) address in a first specialized processing unit of the first processing core;
determining a destination MAC address in a second specialized processing unit of the first processing core;
determining a session for the packet in a third specialized processing unit of the first processing core;
determining a route for the packet in a fourth specialized processing unit of the first processing core;
determining an egress bridge address for the packet in a fifth specialized processing unit of the first processing core;
gathering the results of the separate specialized processing units for the packet at a forwarding block; and
deciding by the forwarding block an action to be performed on the packet based on gathered results.

15. The machine readable medium of claim 14 set of operations, wherein the selecting comprises:
scheduling the packet to the first processing core of the plurality of processing cores because the first processing core is more efficient in processing data in the packet than the other processing cores in the plurality of processing cores.

16. The non-transitory machine readable medium of claim 14 having further instructions stored therein which when executed cause a machine to perform a further set of operations, comprising:
forwarding the packet upon completion of processing by the separate specialized processing units to a central processing unit.

17. The non-transitory machine readable medium of claim 14 having further instructions stored therein which when executed cause a machine to perform a further set of operations, comprising:
processing received packets at a throughput of greater than 10 gigabits per second.

* * * * *